Nov. 10, 1964
R. S. NELSON
3,156,474
SELF-CONTAINED OIL SEAL ASSEMBLY
Filed June 19, 1961
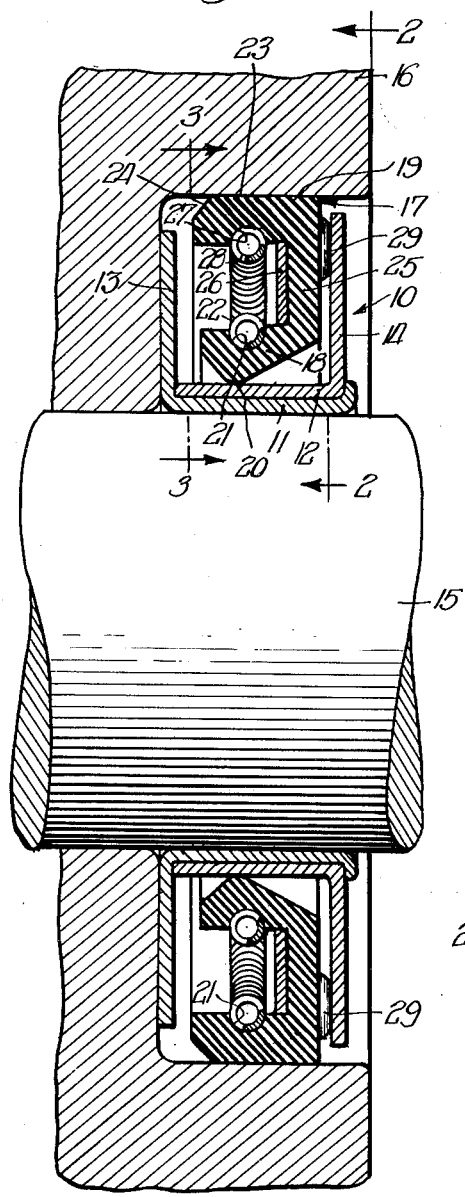
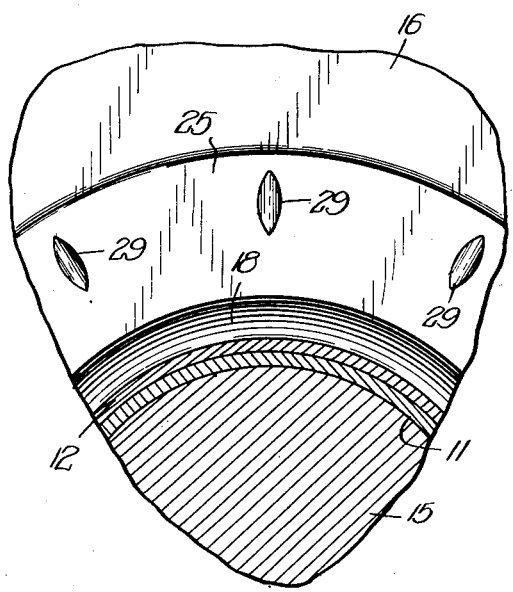
INVENTOR.
Robert S. Nelson,
BY
Cromwell, Greist & Warden
attys.

United States Patent Office 3,156,474
Patented Nov. 10, 1964

3,156,474
SELF-CONTAINED OIL SEAL ASSEMBLY
Robert S. Nelson, Pontiac, Mich., assignor to Chicago Rawhide Manufacturing Company, Chicago, Ill., a corporation of Illinois
Filed June 19, 1961, Ser. No. 118,063
2 Claims. (Cl. 277—39)

This invention is directed to a new and improved oil seal assembly of the type particularly adapted for wheel axle housing installation, the assembly including a self-contained sealing member acting on a pre-finished sealing surface forming a part of the assembly and providing a running seal.

Advances have been made in improving shaft-type seals which provide self-contained running sealing action thus eliminating the cost involved in providing a shaft or shaft housing with a good finish capable of maintaining the sealing efficiency of a flexible lip-type seal. Self-contained assemblies now include a casing of rolled or stamped metal which provide an internal surface of excellent finish for cooperative use with a flexible lip-type seal for efficient sealing action. The sealing member formed from rubber or rubber-like material mounted in the casing must function efficiently to establish and maintain a running seal with the casing while also establishing an efficient and tight seal with the shaft or shaft housing of the installation. Thus, oil seal assemblies of this type providing either an internal or external self-contained running seal must be efficiently double-acting. One of the primary purposes of such an assembly is the elimination of the necessity of finishing a shaft or shaft housing in the seal mounting area and the action of the sealing member against the shaft or shaft housing must be adequate to establish an effective static seal with an unfinished surface.

It is an object of the present invention to provide a new and improved oil seal assembly of self-contained type which utilizes a new design of flexible sealing member capable of efficiently establishing and maintaining an assembly-contained running seal and a static seal with an unfinished surface.

Still a further object is to provide a new and improved self-contained oil seal assembly utilizing a double lip, double-acting sealing member of unique design including means forming a part thereof to maintain the sealing member in efficiently functioning position within the assembly.

Still another object is to provide an oil seal assembly for mounting between a pair of relatively movable parts, the assembly including a casing in which is received a double-acting sealing member provided with oppositely acting flexible sealing lips one of which is maintained in running sealing engagement with a surface of the casing and the other of which is maintained in static sealing engagement with one of said parts.

Other objects not specifically set forth will become apparent from the following detailed description of the present invention made in conjunction with the accompanying drawing wherein:

FIG. 1 is a fragmentary vertical section of an oil seal assembly mounted in operative position within a shaft installation, the assembly incorporating the new and improved principles of the present invention;

FIG. 2 is an enlarged fragmentary end view of the sealing member of the assembly of FIG. 1 taken generally along line 2—2 therein; and FIG. 3 is an enlarged, fragmentary opposite end view of the sealing member of the assembly of FIG. 1 taken generally along line 3—3 therein.

The seal assembly illustrated includes a casing 10 formed from a pair of telescoped L-shaped stampings which cooperatively define an outer axial wall portion 11, an inner axial wall portion 12 and axially spaced radially outwardly directed wall portions 13 and 14. The casing 10 is press fitted on a shaft 15 for rotation therewith relative to a shaft housing 16.

A sealing member 17 formed from rubber or rubber-like material is mounted within the casing 10. This sealing member is of generally C-shape in cross section and is formed with oppositely acting, flexible sealing lip portions 18 and 19. The sealing lip portion 18 includes a sealing lip 20 of V outline which engages the inner surface of the inner axial wall portion 12 of the casing 10. The outer surface of the lip portion 18 generally opposite the lip 20 is provided with a circumferentially continuous spring groove 21 in which a continuous coil spring 22 is seated. The spring 22 is a contraction spring functioning to hold and urge the flexible lip portion 18 and the lip 20 thereof into sealing engagement with the inner surface of the axial wall portion 12 of the casing 10.

The outer sealing lip portion 19 includes a flat outer sealing surface 23 placed in fixed engagement with an inner surface portion of the housing 16 over a substantial area to fix the sealing member 17 thereto. The leading edge portion of the sealing lip portion 19 is provided with a beveled surface 24 providing the same with a radial inclination for ready mounting of the sealing member 17 in the housing 16.

The sealing member 17 includes an intermediate neck-like portion 25 formed integral with the oppositely acting sealing lip portions 18 and 19 and having mounted against the inner surface thereof a washer-like stamping 26. The stamping 26 rigidifies the intermediate portion 25 of the sealing member 17 along the inner surface thereof and may be either bonded thereto or inserted in place following forming of the sealing member. The sealing lip portion 19 is formed with a spring groove 27 along the inner surface thereof in which a circumferentially continuous coil spring 28 is mounted. This spring is an expansion spring functioning to aid in maintaining the sealing lip portion 19 in fixed sealing engagement with the housing 16.

The outer surface of the intermediate portion 25 of the sealing member 17 adjacent the radial wall portion 14 of the casing 10 is provided with a plurality of circumferentially spaced, internally formed rib-like projections or chaplets 29 which engage the inner surface of the radial wall portion 14 of the casing 10. The chaplets 29 as best shown in FIG. 2 are relatively small projections and in this respect are partially compressible against the adjacent surface of the casing during installation of the seal assembly. However, the chaplets 29 are capable of functioning to retain proper axial spacing of the sealing member 17 within the casing 10 during installation of the seal assembly as shown in FIG. 1. With this arrangement providing for axial spacing of the sealing member 17 in the casing 10, adequate lubricant can be introduced into the casing 10 for lubrication of the sealing lip 20. The initial frictional drag developed by the chaplets 29 in engagement with the adjacent surface of the casing will eventually be overcome during continued operation of the assembly as a result of the chaplets being worn away.

The embodiment of the seal assembly disclosed makes use of an internal, self-contained seal it being understood that either the shaft 15 or housing 16 may rotate relative to the other with a running seal being established between the sealing member 17 and the casing 10. An external, self-contained seal may be formed to incorporate the principles of the present invention by ready modification of the parts as illustrated. This would include, by way of example, the fixing of the casing 10 to the housing 16 and mounting of the sealing lip portion 19 on the shaft 15.

The seal assembly disclosed is capable of efficient longlife functioning for several reasons. The internal sealing lip 20 is in engagement with a rolled stamping surface providing an almost perfect finish. With the presence of imperfections being minimized, the sealing lip 20 is not subject to substantial operational damage. With this arrangement the necessity of providing a special finish to the shaft 15 or housing 16 is eliminated. The special configuration of the sealing lip portion 19 provides for ready accommodation of any imperfections in the mounting surface of the housing 16 and efficient fixed mounting of the sealing member 17 therein.

Obviously certain modifications and variations of the invention as hereinbefore set forth may be made without departing from the spirit and scope thereof, and therefore only such limitations should be imposed as are indicated in the appended claims.

I claim:

1. An oil seal assembly for mounting between a pair of relatively movable parts, said assembly including a casing having an axial wall portion for mounting in fixed sealed relation on one of said parts, said casing having spaced radial wall portions formed integral with said axial wall portion extending toward the other of said parts, a sealing member of generally C-shape in cross section in said casing and being formed with axially extending radially spaced parallel and oppositely acting flexible sealing lips joined by a normally flexible radially extending intermediate portion having inner and outer radial faces, and spring means carried by each of said lips to urge one of said lips into running sealing engagement with said axial wall portion and hold the other of said lips radially outwardly of said casing for fixed sealing engagement with the other of said parts, the intermediate portion of said sealing member extending along one of said radial wall portions in paralleling spaced relation thereto and having circumferentially spaced rib-like projections formed on the outer radial face thereof and in engagement with said one radial wall portion to maintain axial spacing of said sealing member in said casing during installation and subsequent operational use of said assembly for lubrication of said one sealing lip, said intermediate portion further being provided with a flat washer-like rigidifying means mounted along the inner radial face thereof opposite to said rib like projections with the opposite edges of said rigidifying means being in engagement with the inner surface edge portions of said sealing lips in the areas of flexible connection of said sealing lips with said intermediate portion, the sealing surface of the other of said sealing lips being generally axially flat with the leading edge portion thereof being radially inclined for ready mounting thereof on the other of said parts.

2. The seal assembly of claim 1 wherein each of said sealing lips along the inner surfaces thereof are grooved to retain a spring means therein.

References Cited in the file of this patent

UNITED STATES PATENTS

| | | |
|---|---|---|
| 2,162,104 | Mosher | June 13, 1939 |
| 2,873,153 | Haynie | Feb. 10, 1959 |
| 3,021,161 | Rhoades et al. | Feb. 13, 1962 |
| 3,086,781 | Hudson et al. | Apr. 23, 1963 |